US011963543B2

(12) United States Patent
Berge

(10) Patent No.: US 11,963,543 B2
(45) Date of Patent: Apr. 23, 2024

(54) APPARATUS AND RELATED METHODS FOR PREPARING POPCORN

(71) Applicant: National Presto Industries, Inc., Eau Claire, WI (US)

(72) Inventor: Michael R Berge, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 190 days.

(21) Appl. No.: 17/188,808

(22) Filed: Mar. 1, 2021

(65) Prior Publication Data

US 2021/0177018 A1 Jun. 17, 2021

Related U.S. Application Data

(60) Continuation of application No. 15/824,326, filed on Nov. 28, 2017, now abandoned, which is a division of application No. 14/598,702, filed on Jan. 16, 2015, now Pat. No. 9,826,771.

(51) Int. Cl.
  *A23L 7/187* (2016.01)
  *A23L 7/183* (2016.01)

(52) U.S. Cl.
  CPC .............. *A23L 7/187* (2016.08); *A23L 7/183* (2016.08)

(58) Field of Classification Search
  CPC .......... A23L 7/161; A23L 7/174; A23L 7/183; A23L 7/187
  USPC .................................. 99/323.5, 323.7, 323.9
  See application file for complete search history.

(56) References Cited

U.S. PATENT DOCUMENTS

| 1,733,301 | A |   | 10/1929 | Hood |
|---|---|---|---|---|
| 2,241,754 | A | * | 5/1941 | Wilsey ..................... A23L 7/187 99/323.5 |
| D193,260 | S |   | 7/1962 | Dewenter |
| 3,059,567 | A | * | 10/1962 | Lindemann ............. A23L 7/187 99/323.11 |
| 3,665,839 | A | * | 5/1972 | Gottlieb .................. A23L 7/187 99/323.5 |
| 3,699,874 | A |   | 10/1972 | Dusek |
| 3,756,139 | A |   | 9/1973 | Wolens |
| D229,387 | S |   | 11/1973 | Gruber |
| 4,138,937 | A |   | 2/1979 | De Weese |
| 4,152,974 | A |   | 5/1979 | Tienor |
| 4,178,843 | A | * | 12/1979 | Crabtree ................. A23L 7/187 426/445 |
| D256,019 | S |   | 7/1980 | Boldt et al. |
| D259,385 | S |   | 6/1981 | Levin |

(Continued)

OTHER PUBLICATIONS

Presto® Hot Air Popper User Manual, copyright 2009, 4 pages.
(Continued)

*Primary Examiner* — Reginald Alexander
(74) *Attorney, Agent, or Firm* — Kenneth A. Smith

(57) ABSTRACT

Disclosed is a heated air popcorn popper which provides a heating base assembly and popping pitcher having an interior popping volume which is detachable from the base assembly for introduction of popcorn kernels. The base assembly providing heated air to the popping pitcher causing unpopped kernels to pop and form popped popcorn. The detachable popping pitcher includes a pitcher lifting handle such that the popping pitcher can be lifted away from the heating base assembly to permit any remaining unpopped or popped kernels to be emptied from the detachable popping pitcher for cleaning.

11 Claims, 21 Drawing Sheets

(56) References Cited

U.S. PATENT DOCUMENTS

| | | | |
|---|---|---|---|
| D260,649 S | 9/1981 | Wondergem | |
| D262,426 S | 12/1981 | Bluestein et al. | |
| D279,069 S | 6/1985 | Goodlaxson | |
| D279,070 S | 6/1985 | Morrison | |
| D279,448 S | 7/1985 | Spoeth, Jr. | |
| 4,538,509 A | 9/1985 | Oiima et al. | |
| D281,137 S | 10/1985 | Cesaroni | |
| 4,702,158 A | 10/1987 | Ishihara | |
| D294,673 S | 3/1988 | Solomon | |
| 4,748,903 A | 6/1988 | Fereshetian | |
| 4,763,568 A * | 8/1988 | Kiczek | A23L 7/187 219/400 |
| D298,202 S | 10/1988 | Levin | |
| 4,870,896 A | 10/1989 | Asahina et al. | |
| 4,920,760 A | 5/1990 | Muhlack | |
| D317,238 S | 6/1991 | Busick | |
| D317,838 S | 7/1991 | Millet et al. | |
| D325,483 S | 4/1992 | Muhlack | |
| D338,800 S | 8/1993 | Duauaine | |
| 5,279,213 A | 1/1994 | Miyahara | |
| D354,639 S | 1/1995 | Stoddard et al. | |
| 5,397,879 A | 3/1995 | Geissler | |
| 5,421,253 A | 6/1995 | Rehmeyer | |
| D360,102 S | 7/1995 | Geissler et al. | |
| D361,918 S | 9/1995 | Cesaroni et al. | |
| 5,481,962 A | 1/1996 | Tedesco | |
| 5,501,139 A | 3/1996 | Lee | |
| 5,544,573 A | 8/1996 | Gateaud | |
| 5,928,550 A | 7/1999 | Weiss | |
| 6,000,318 A | 12/1999 | Weiss et al. | |
| D442,816 S | 5/2001 | Chen | |
| RE37,238 E | 6/2001 | Song | |
| D461,097 S | 8/2002 | Nemirovsky | |
| 6,752,071 B1 | 6/2004 | Snyder | |
| D551,016 S | 9/2007 | Bond | |
| D552,405 S | 10/2007 | Bond | |
| D569,677 S | 5/2008 | Poon | |
| D607,260 S | 1/2010 | Lam | |
| D615,797 S | 5/2010 | Berge et al. | |
| D625,604 S | 10/2010 | Zaslow | |
| D628,428 S | 12/2010 | Bond | |
| D628,847 S | 12/2010 | Liu | |
| D632,123 S | 2/2011 | Kauer | |
| D633,748 S | 3/2011 | Haskin | |
| D642,006 S | 7/2011 | Seymour | |
| D645,292 S | 9/2011 | Bond | |
| D650,627 S | 12/2011 | Kauer | |
| 8,127,565 B1 | 3/2012 | Lange et al. | |
| D663,992 S | 7/2012 | Kauer | |
| D677,969 S | 3/2013 | Bond et al. | |
| D687,666 S | 8/2013 | Mercier | |
| 8,931,401 B2 | 1/2015 | Cheung | |
| D722,245 S | 2/2015 | Mao | |
| D723,320 S | 3/2015 | Rooney et al. | |
| D760,011 S | 6/2016 | Berge et al. | |
| 9,655,378 B2 | 5/2017 | Rooney et al. | |
| 2013/0276641 A1 | 10/2013 | Vidojevic | |
| 2015/0047511 A1 | 2/2015 | Mastroianni | |
| 2015/0305375 A1 | 10/2015 | Rooney et al. | |

OTHER PUBLICATIONS

Presto® Stirring Popcorn Popper User Manual, copyright 2010, 6 pages.
Presto® PowerPop Microwave Multi-Popper User Manual, copyright 2008, 8 pages.
Application and File History for U.S. Appl. No. 29/514,833, filed Jan. 25, 2015. Inventors: Berge et al.
Application and File History for U.S. Appl. No. 29/489,092, filed Apr. 25, 2014. Inventors: Rooney et al.
Application and File History for U.S. Appl. No. 14/262,299, filed Apr. 25, 2014. Inventors: Rooney et al.
Application and File History for U.S. Appl. No. 14/598,702, filed Jan. 16, 2015. Inventors: Berge et al.

* cited by examiner

APPARATUS AND RELATED METHODS FOR PREPARING POPCORN

CROSS REFERENCE TO RELATED APPLICATIONS

This application is a continuation of pending U.S. patent application Ser. No. 15/824326, filed on Nov. 28, 2017, which is a divisional application of U.S. patent application Ser. No. 14/598702, filed on Jan. 16, 2015, which issued as U.S. Pat. No. 9,826,771, both of which are incorporated herein by reference in their entirety.

FIELD OF THE INVENTION

The present invention relates generally to apparatus and methods for preparing popcorn. More specifically, the present invention relates to apparatus and related methods of preparing popcorn using a hot air popper with a removable kernel pitcher.

BACKGROUND OF THE INVENTION

Popcorn is one of the most universally consumed snacks. Conventional methods for preparing popcorn have utilized heated oil, microwave heating or heated air as the heating medium. One benefit of utilizing heated air is that the popcorn can control the addition of any extra calories or fat as no oil is utilized in the popping process and the addition of butter and/or other flavors or toppings can be accomplished after the popping process is completed.

One of the most popular settings for the consumption of popcorn is in movie theaters. Traditionally, theaters have utilized heated oil based systems to pop large volumes of popcorn. During the popping process, popped kernels exit out of a popping tub and are collected on the floor of a popping structure that allows for theater workers to reach in and fill bags or tubs with freshly popped popcorn. Following popping, the theater workers typically rotate the popping tub to an upside down disposition so that any remaining popped and unpopped kernels are emptied onto the floor of the popping structure.

The look and style of traditional theater popcorn poppers has been replicated in a smaller fashion so as to fit into a home setting. Generally, these home versions of the theater popcorn popper have a reduced size such that smaller volumes of popcorn are popped and stored for consumption. In addition to having a reduced size, the way in which kernels are popped have been changed from a conventional heated oil arrangement to a hot air arrangement. Using heated air allows for cleaner operation and does not require the user to have oil on hand. In addition, the heated air operation reduces the potential for smoke.

While theater style popcorn poppers are available for residential use, it would be advantageous to further improve upon their designs to provide additional functionality and ease of use.

SUMMARY OF THE INVENTION

A heated air popcorn popper of the present invention provides easy access and clean up through the use of a detachable popping pitcher. Generally, the detachable popping pitcher defines an interior popping volume in which heated air is used to cause unpopped kernels to pop and form popped popcorn. The detachable popping pitcher can comprise a pitcher handle allowing a user to grasp and manipulate the popping pitcher when selectively detaching and attaching the popping pitcher to the popcorn popper. In a theater style, heated air popcorn popper, the detachable popping pitcher is completely removable from a popper housing such that loading unpopped kernels into the popping pitcher is simplified and the user need not be concerned about access being awkward or limited. In a similar manner, the detachable popping pitcher can be fully removed from the popper housing following popping such that any remaining unpopped or popped kernels can be emptied from the detachable popping pitcher and the detachable popping pitcher can be cleaned if so desired. In some embodiments, the detachable popping pitcher can be selectively detached or attached from the popcorn popper with a latching mechanism. In some embodiments, the detachable popping pitcher can include one or more retaining members at an upper portion of the popping pitcher to retain popcorn in a popping volume of the popping pitcher until the level of popcorn rises so as to physically cause the one or more retaining members to open.

In one aspect, the present invention is directed to a popcorn popper having a detachable popping pitcher In another aspect, the present invention is directed to a method for loading unpopped kernels into a popcorn popper.

In yet another aspect, the present invention can comprise a theater-style hot air popper having a detachable popping pitcher for loading unpopped kernels outside of the theater-style hot air popper.

In yet another aspect, the present invention is directed to a method of emptying a popcorn popper by removing a detachable popping pitcher. In some embodiments, the method can further comprise cleaning the detachable popping pitcher.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

A specific embodiment is now described by way of example to further the understanding of the present disclosure, with reference to the accompanying drawings in which.

Figure 1:
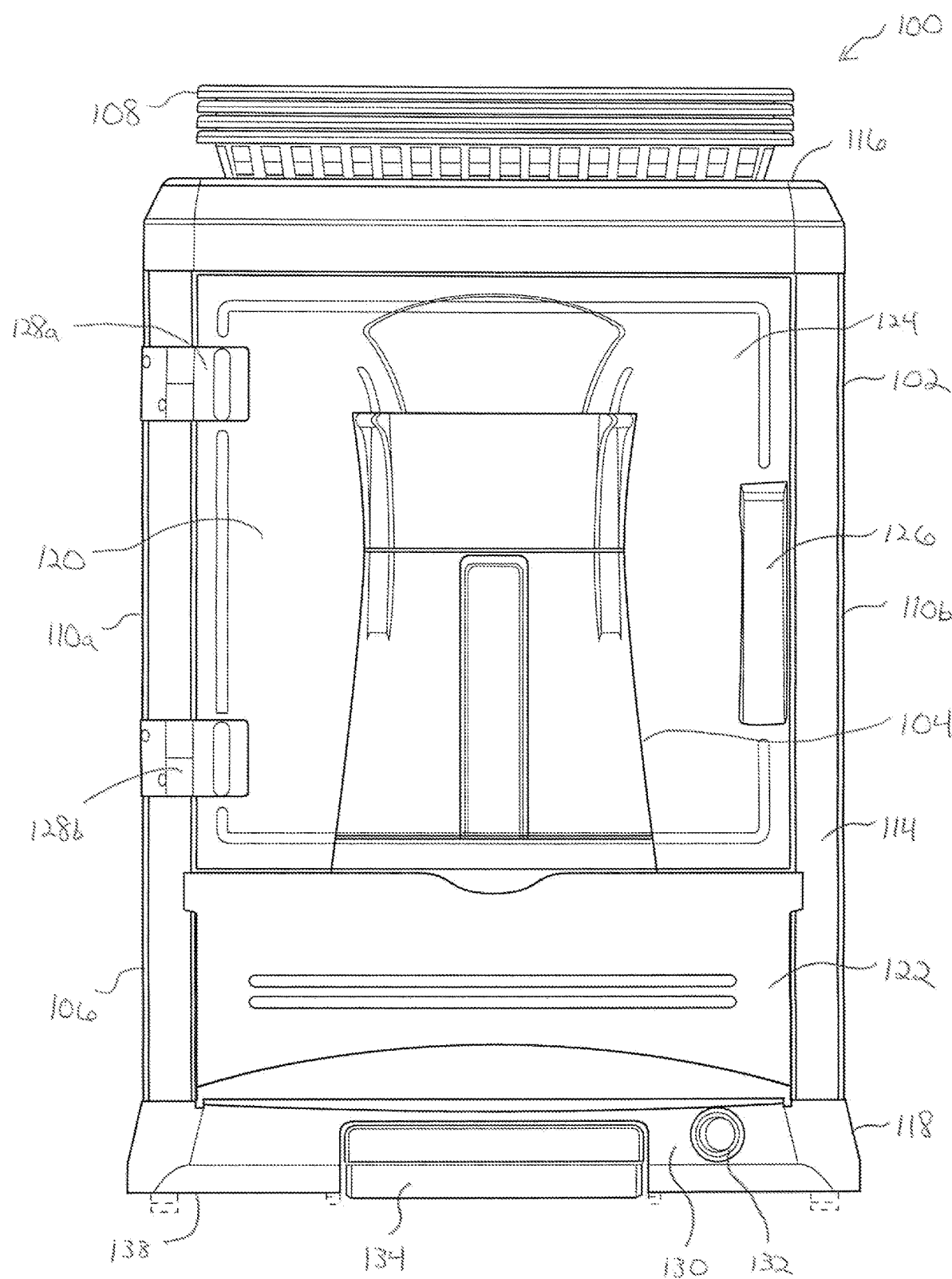
FIG. 1 is a front view of a theater-style popcorn popper according to a representative embodiment of the present invention.
Figure 2:
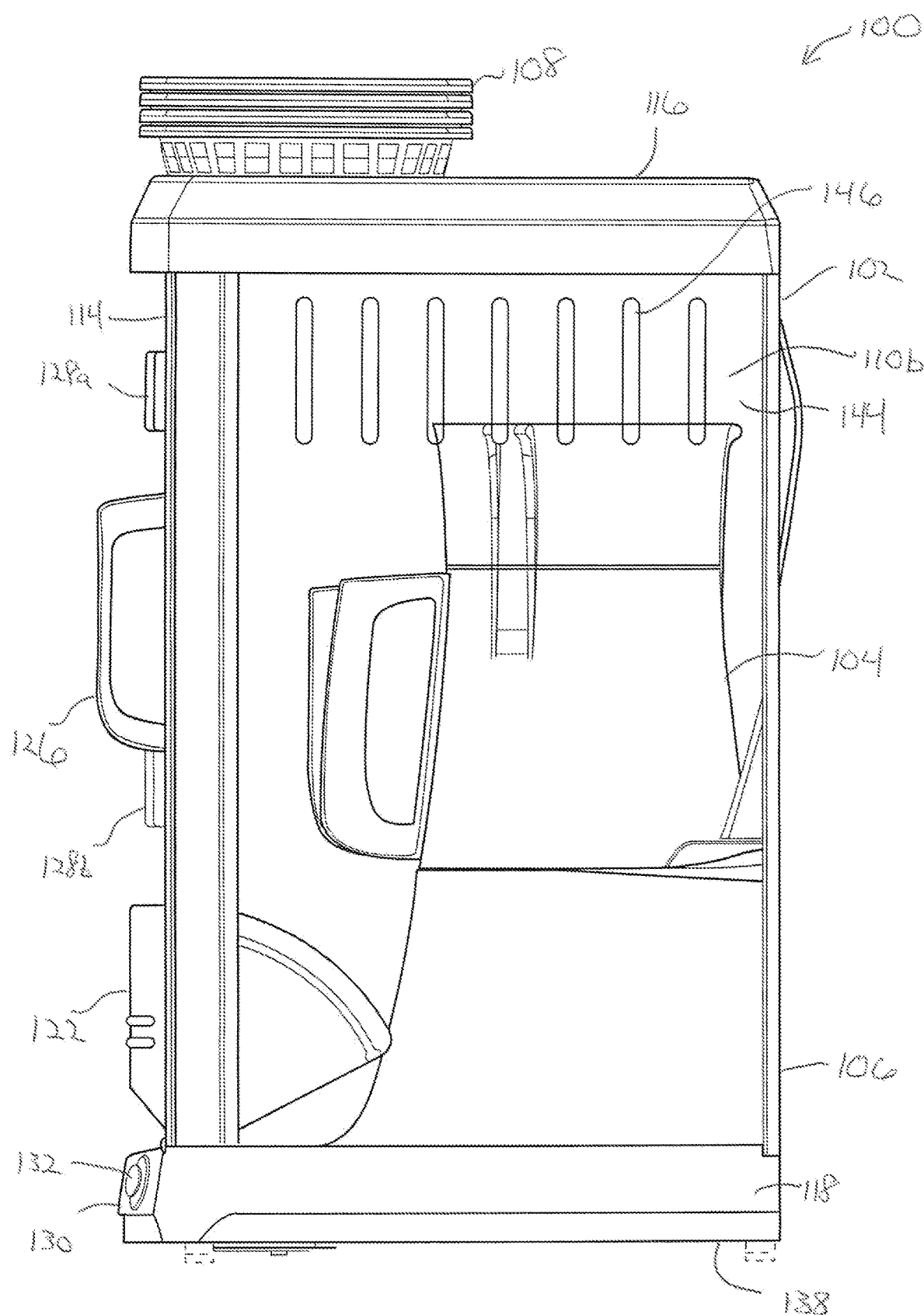
FIG. 2 is a side view of the theater-style popcorn popper of FIG. 1.
Figure 3:
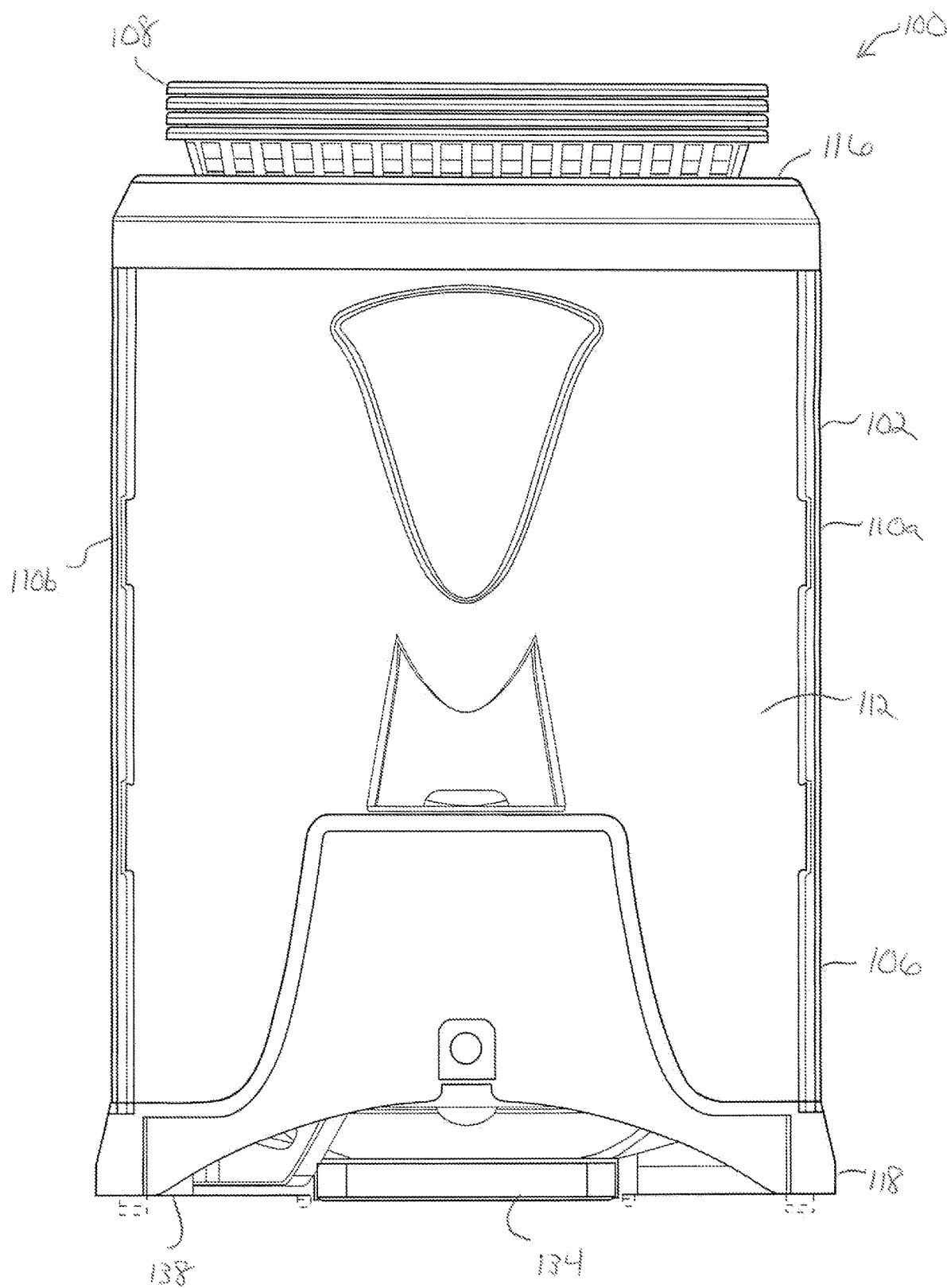
FIG. 3 is a rear view of the theater-style popcorn popper of FIG. 1.
Figure 4:
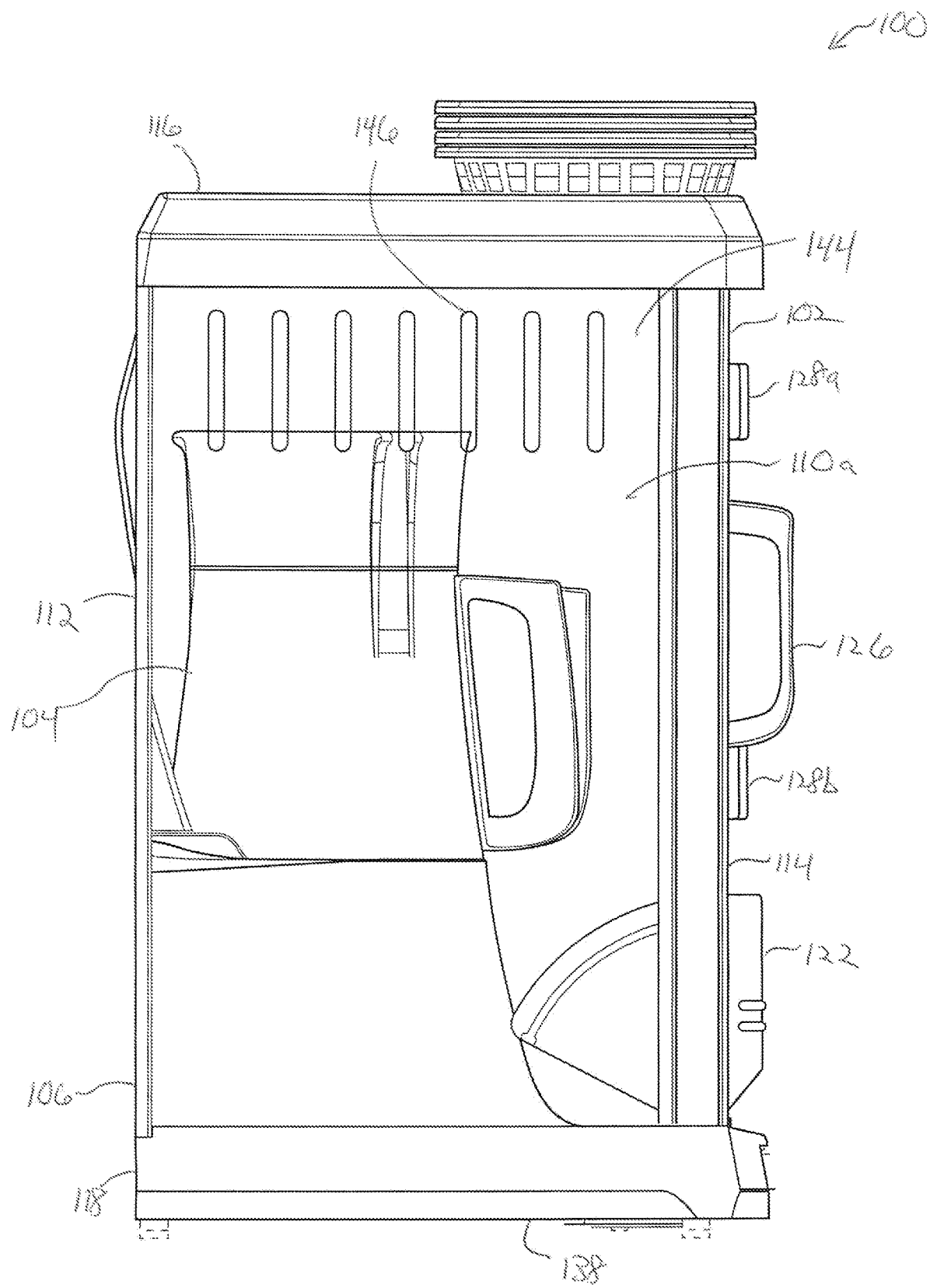
FIG. 4 is a side view of the theater-style popcorn popper of FIG. 1.
Figure 5:
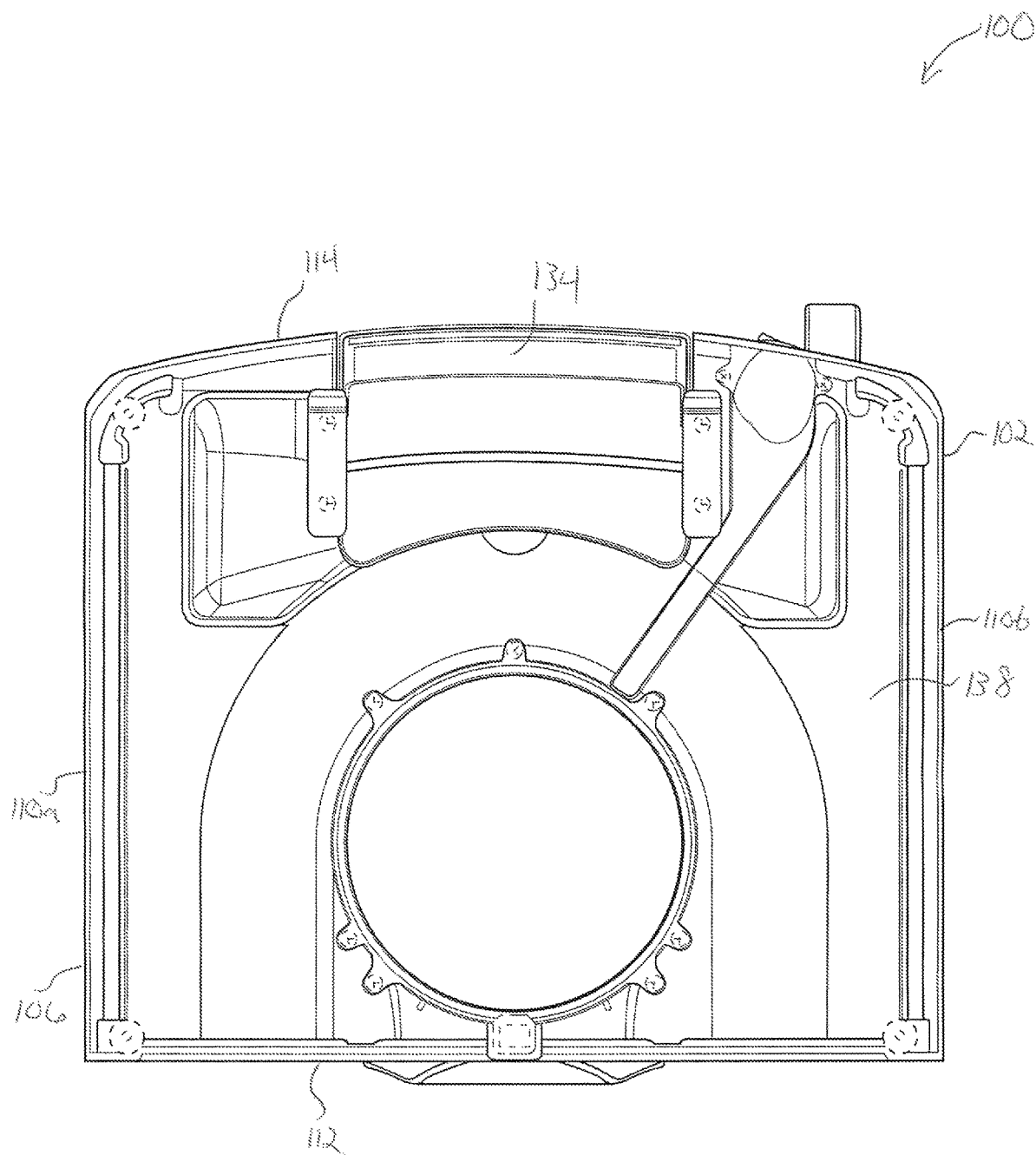
FIG. 5 is a bottom view of the theater-style popcorn popper of FIG. 1.
Figure 6:
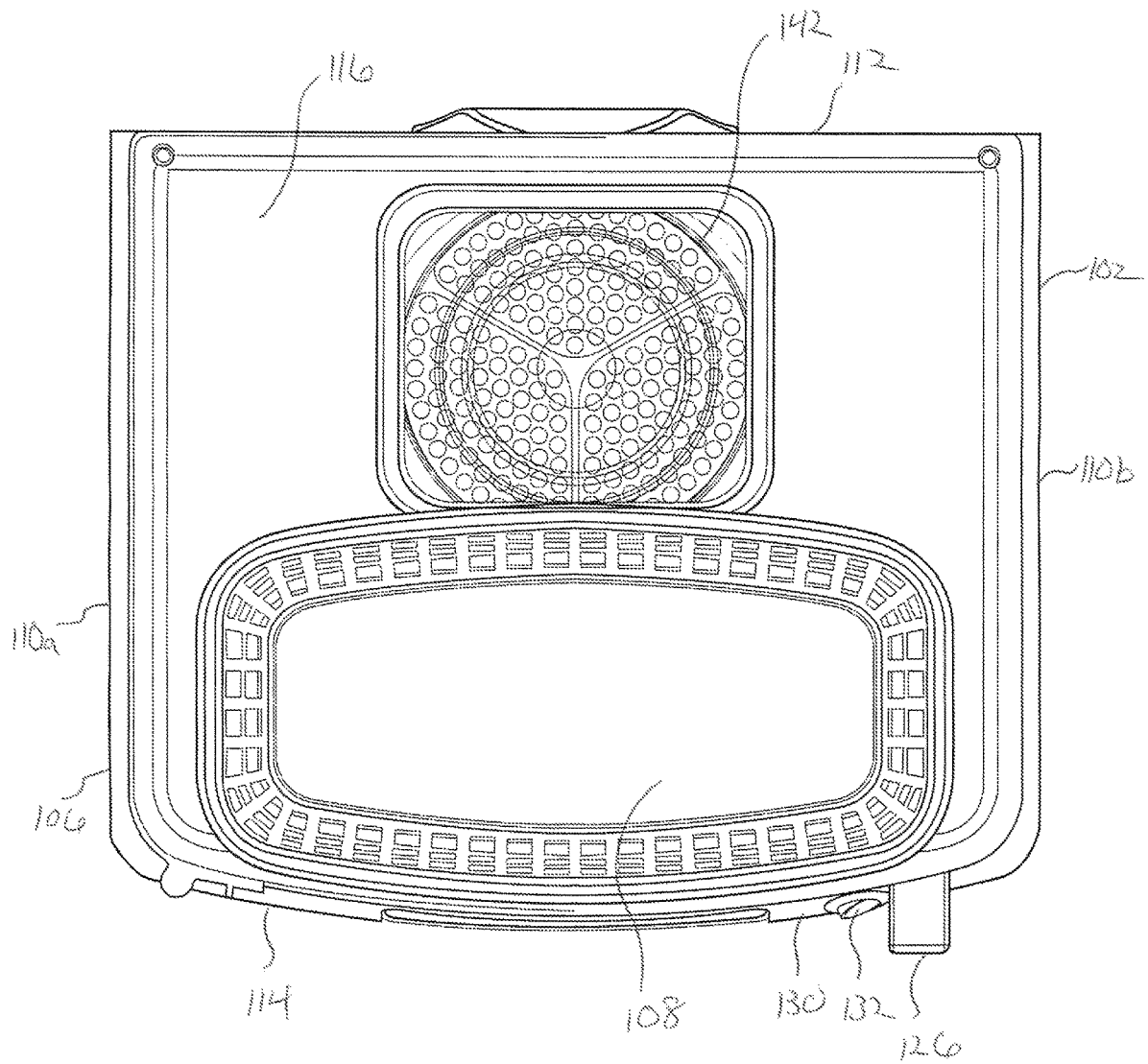
FIG. 6 is a top view of the theater-style popcorn popper of FIG. 1.
Figure 7:
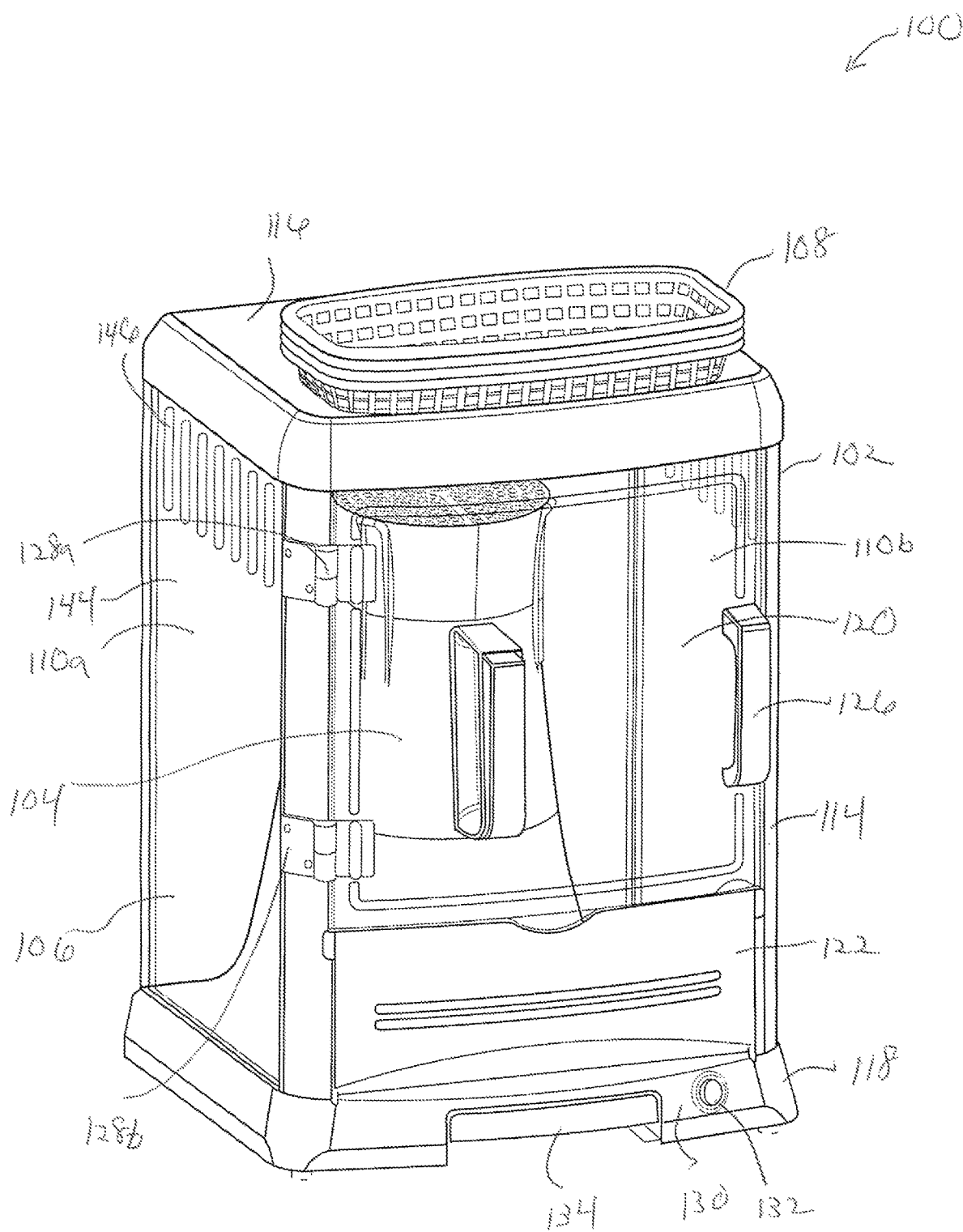
FIG. 7 is a top, perspective view of the theater-style popcorn popper of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring generally to FIGS. 1-8, a representative embodiment of a popcorn popper 100 of the present invention can comprise a popper housing 102 and a detachable popping pitcher 104. In some embodiments, popper housing 102 can comprise a theater-style housing 106. In addition, popcorn popper 100 can also include one or more serving baskets 108. Popcorn popper 100 is generally fabricated of materials suited for food contact and preparation including metals such as aluminum and stainless steel, plastic polymers such as polycarbonate, glass as well as similar materials and combinations thereof.

With reference to FIGS. 1-8, popper housing 102 generally includes a pair of side walls 110a, 110b, a rear wall 112, a front wall 114, a top wall 116 and a base assembly 118. Front wall 114 is generally defined by a door assembly 120 and a serving panel 122. Door assembly 120 generally comprises a transparent door 124, a door handle 126 and door hinge assemblies 128a, 128b. The base assembly 118 can define a control surface 130 including a control or power button 132 for operably controlling the popcorn popper 100 as well as a removable drip tray 134. The base assembly 118 further defines an interior floor surface 136 as well as an external bottom surface 138. Top wall 116 can comprise a tray recess 140 and an air vent 142. Each of the side walls 110a, 110b generally comprises a transparent surface 144 having a vent portion 146.

Figure 8:
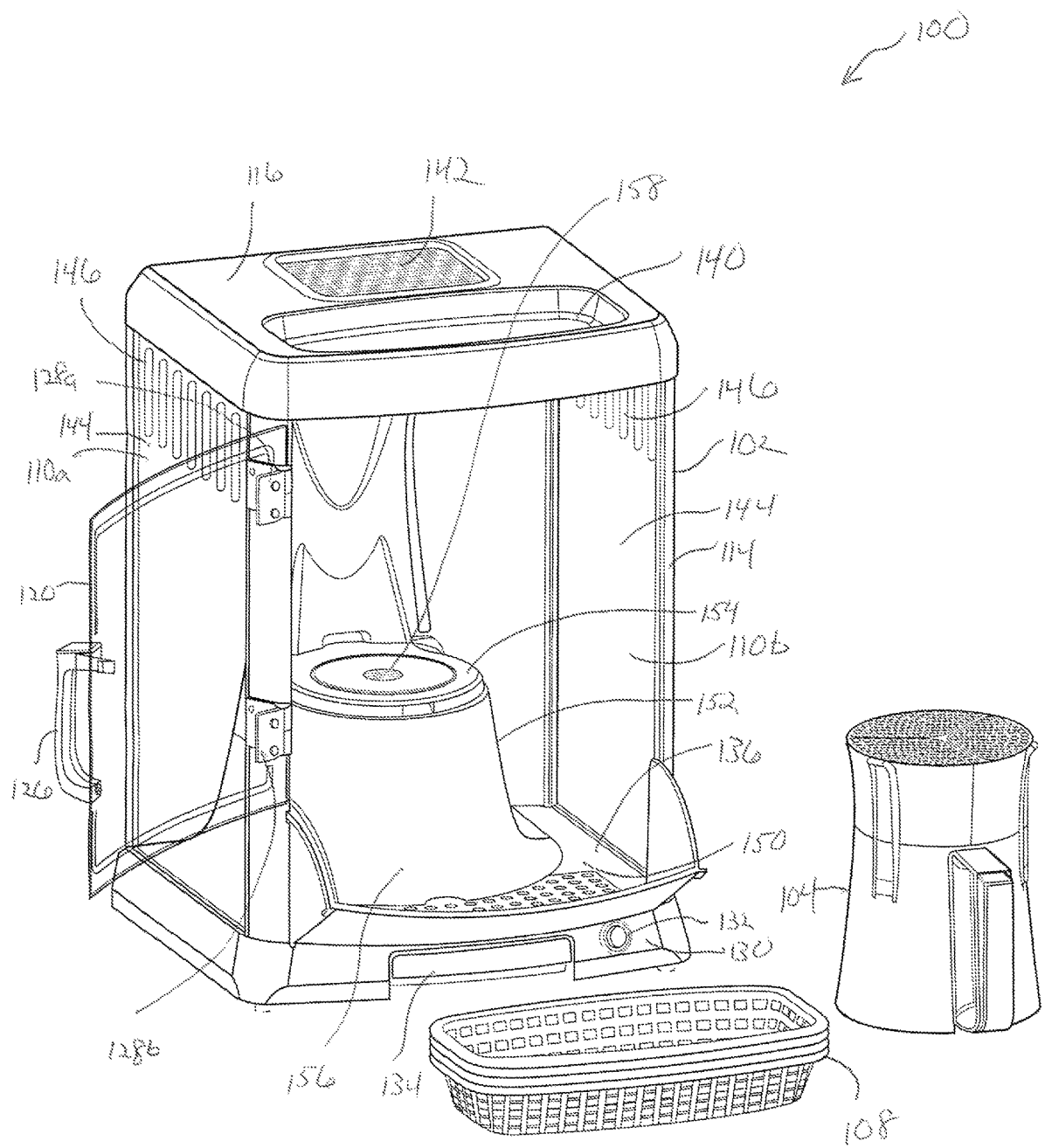
FIG. 8 is a top, perspective view of the theater-style popcorn popper of FIG. 1 with a door in an open position and a detachable popping pitcher removed from a popper housing.
Figure 9:
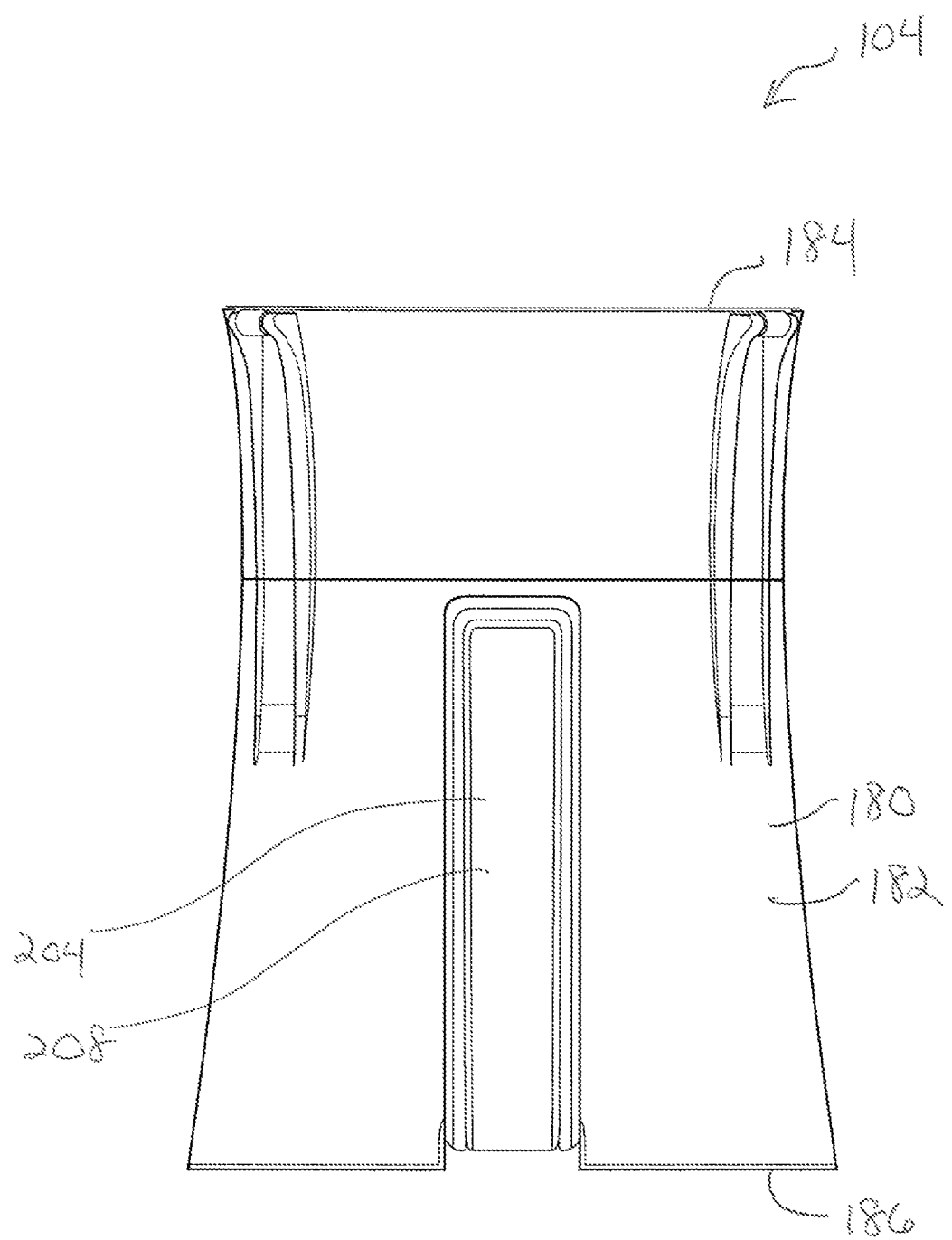
FIG. 9 is a front view of a detachable popping pitcher according to a representative embodiment of the present invention.
Figure 10:
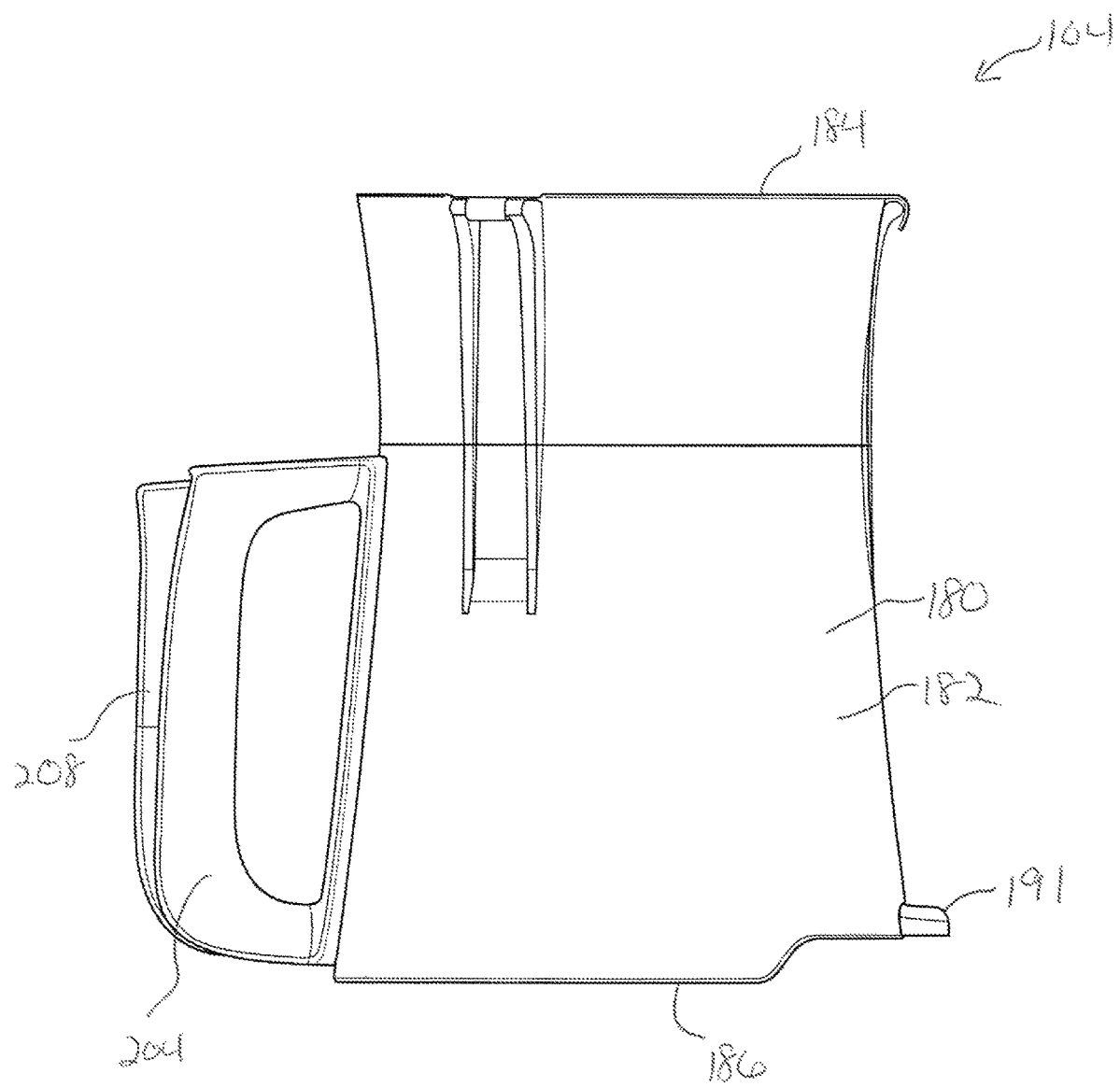
FIG. 10 is a side view of the detachable popping pitcher of FIG. 9.
Figure 11:
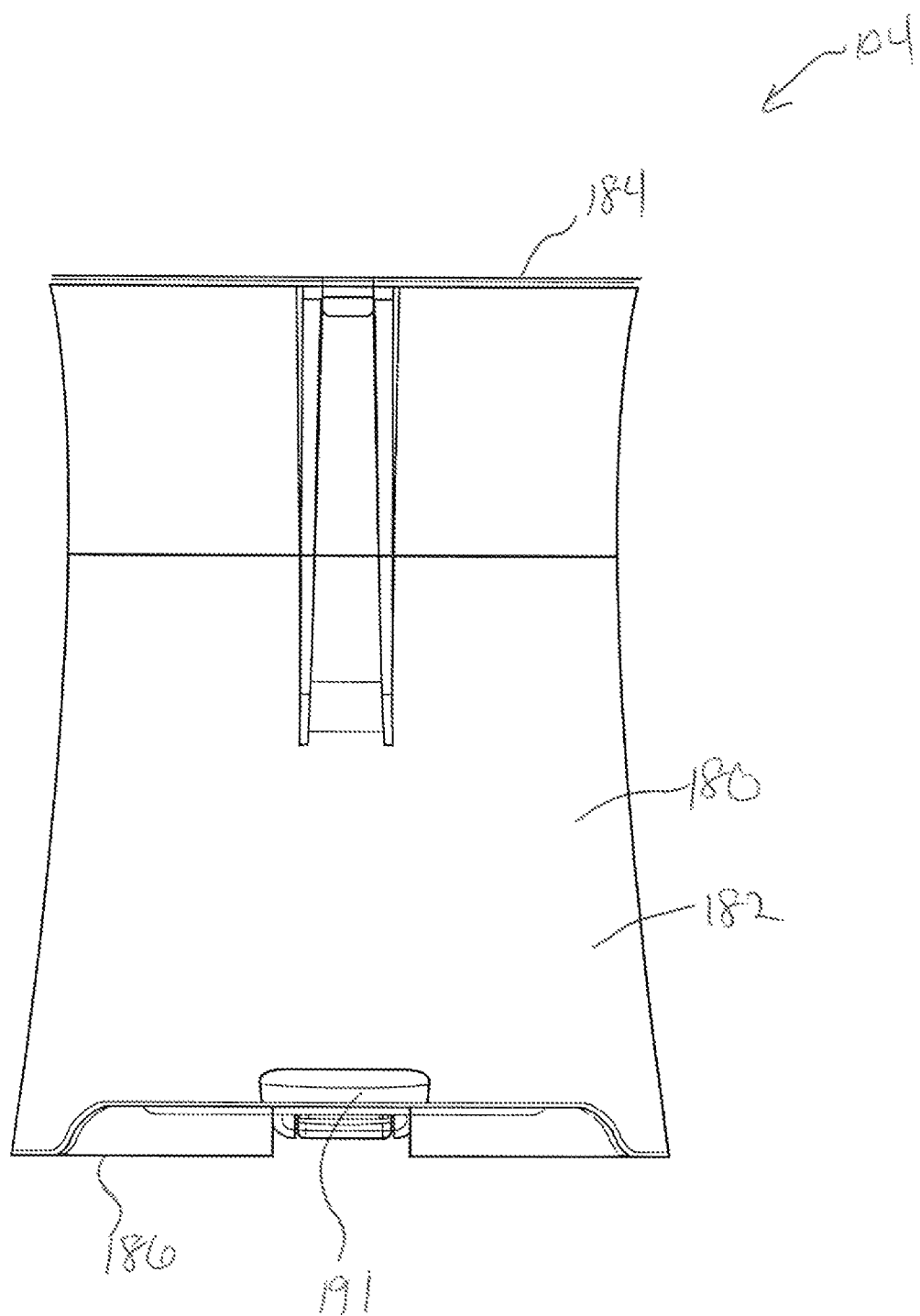
FIG. 11 is a rear view of the detachable popping pitcher of FIG. 9.
Figure 12:
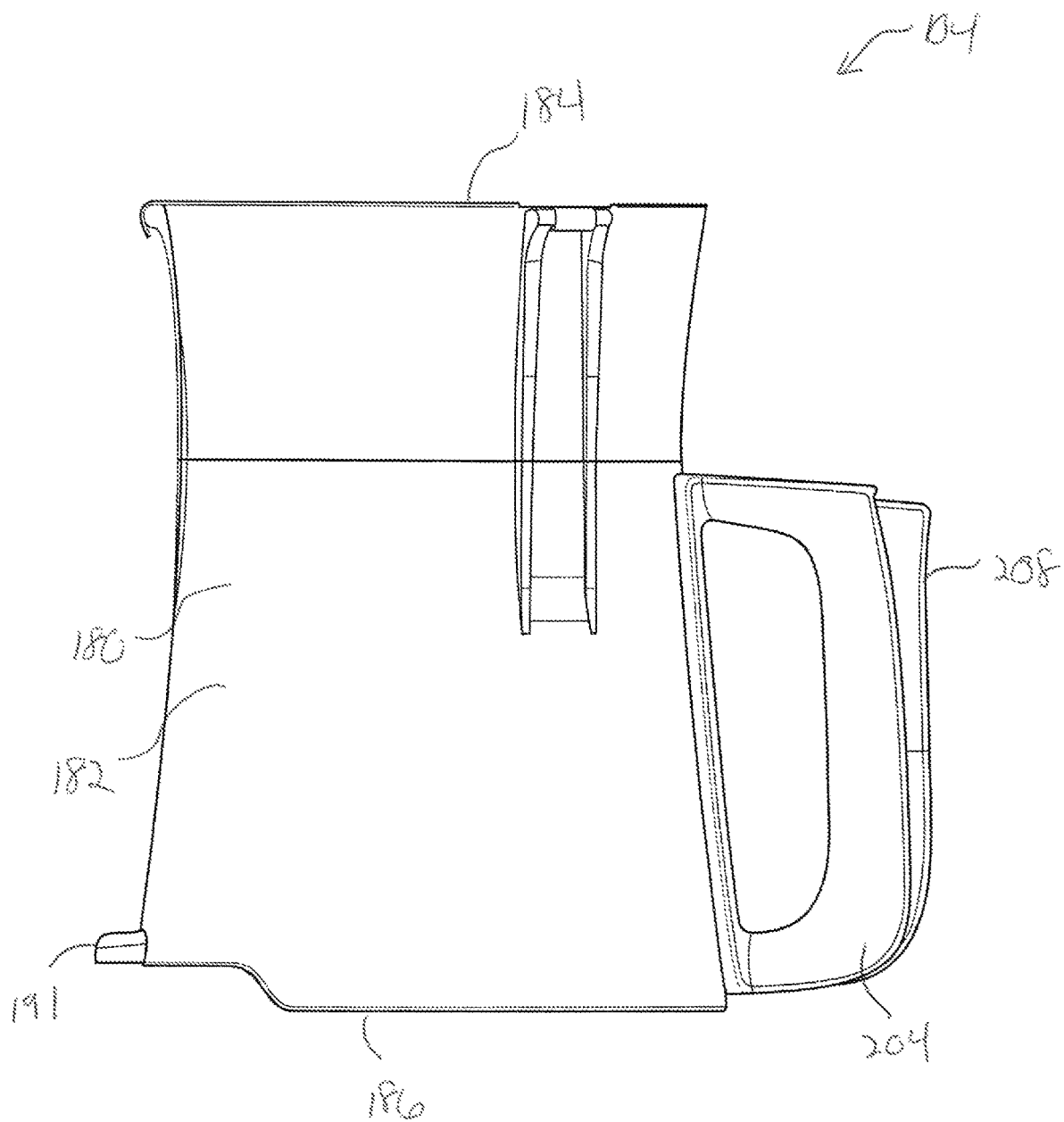
FIG. 12 is a rear view of the detachable popping pitcher of FIG. 9.
Figure 13:
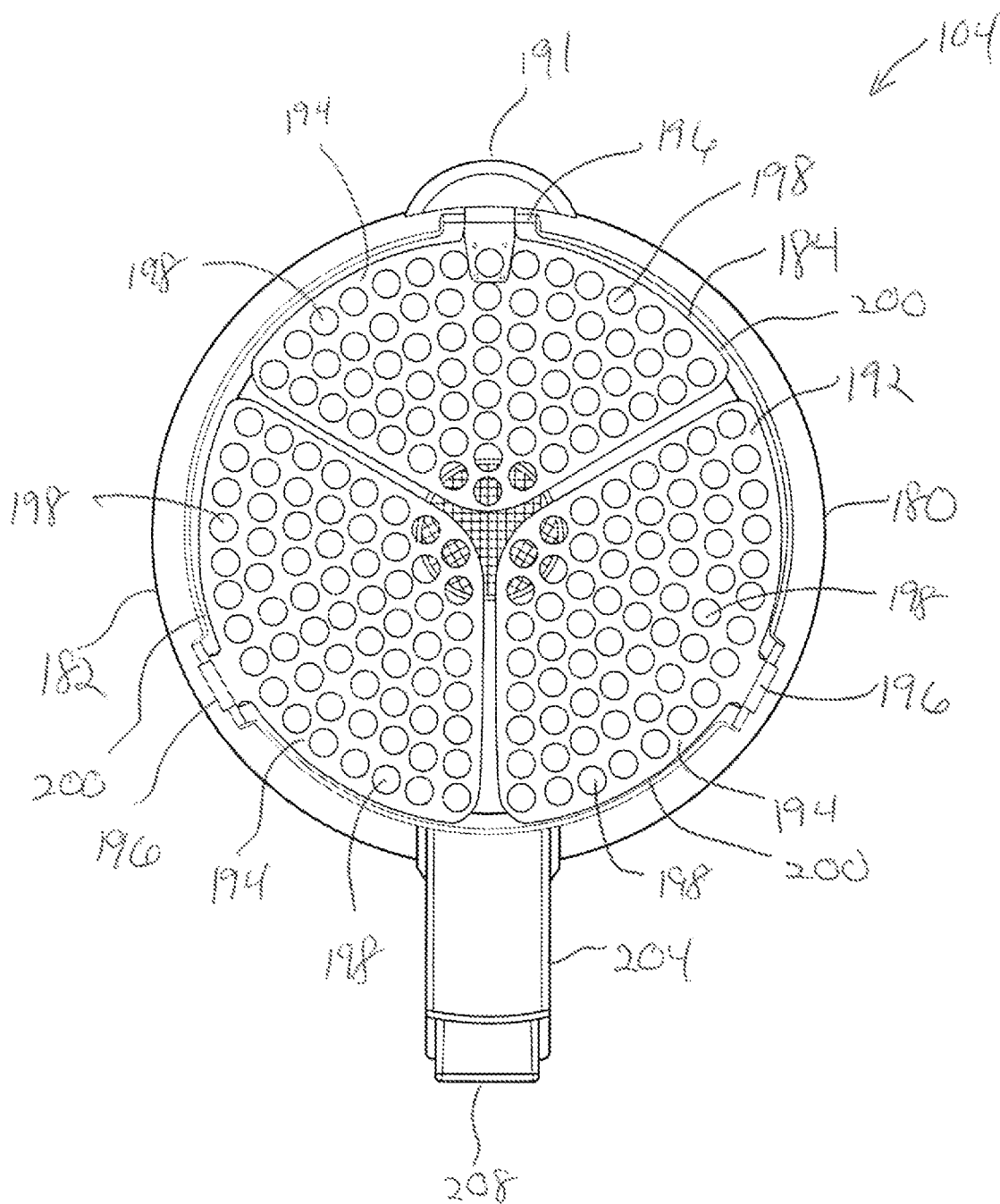
FIG. 13 is a top view of the detachable popping pitcher of FIG. 9.
Figure 14:
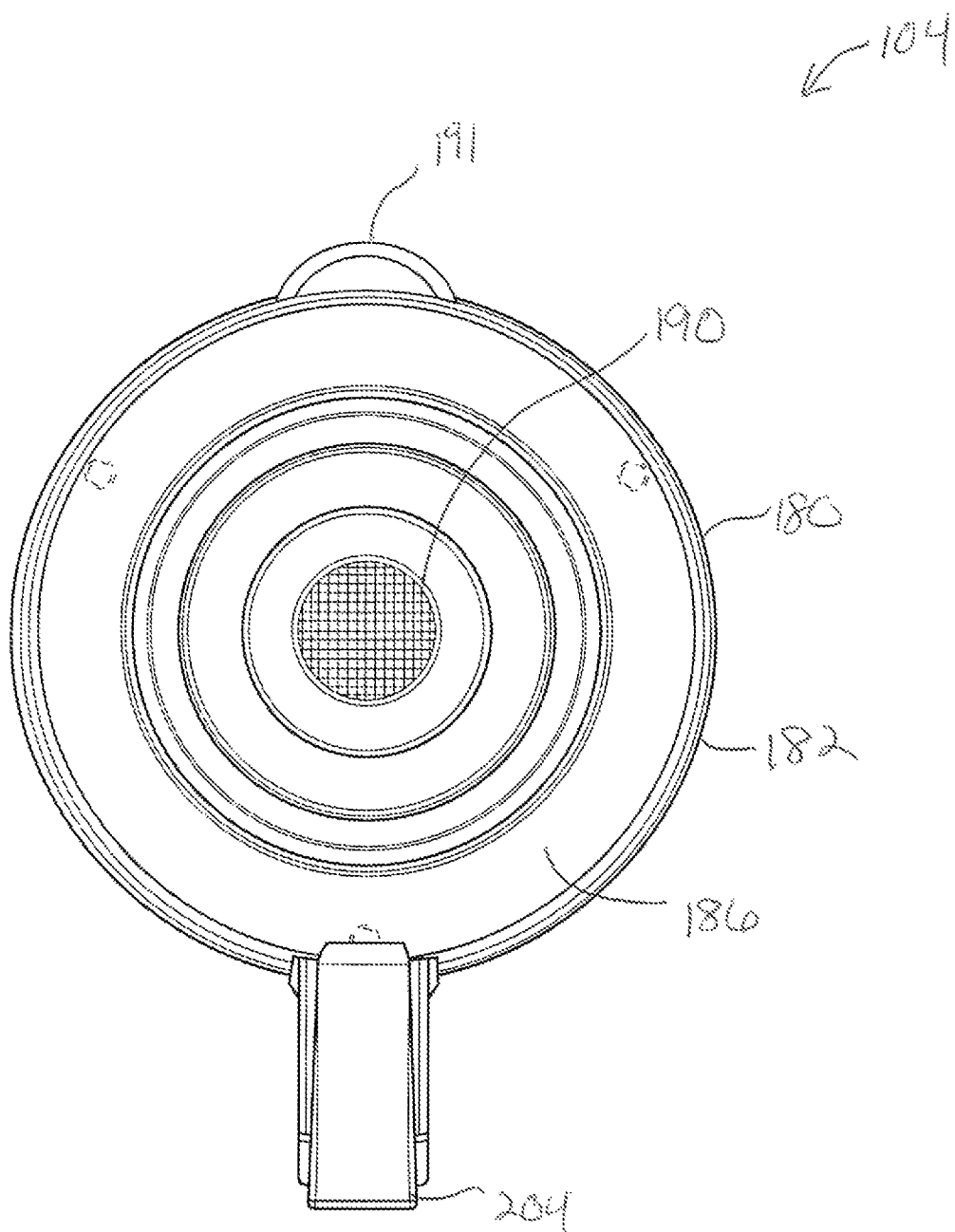
FIG. 14 is a bottom view of the detachable popping pitcher of FIG. 9.
Figure 15:
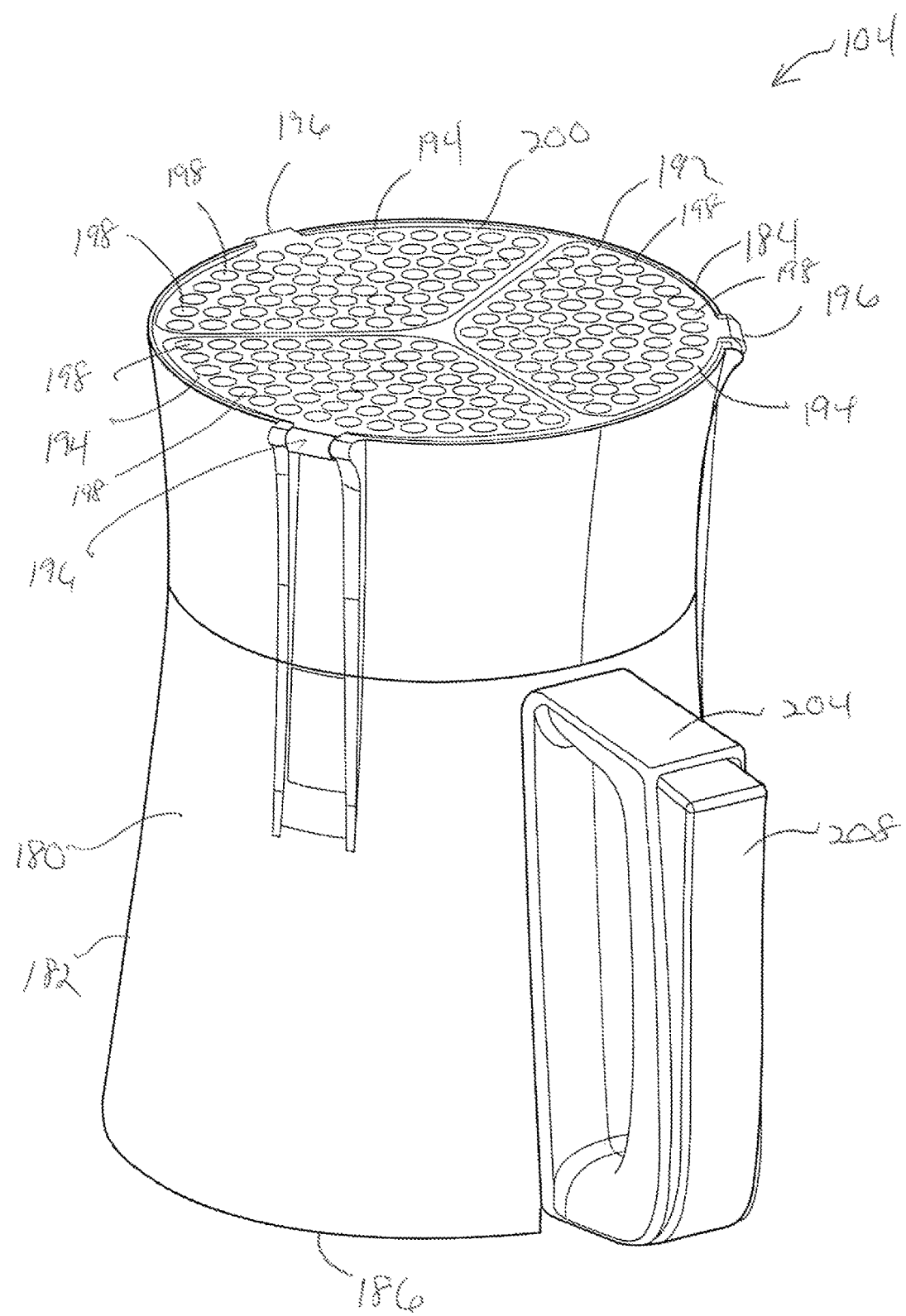
FIG. 15 is a top, perspective view of the detachable popping pitcher of FIG. 9.
Figure 18:
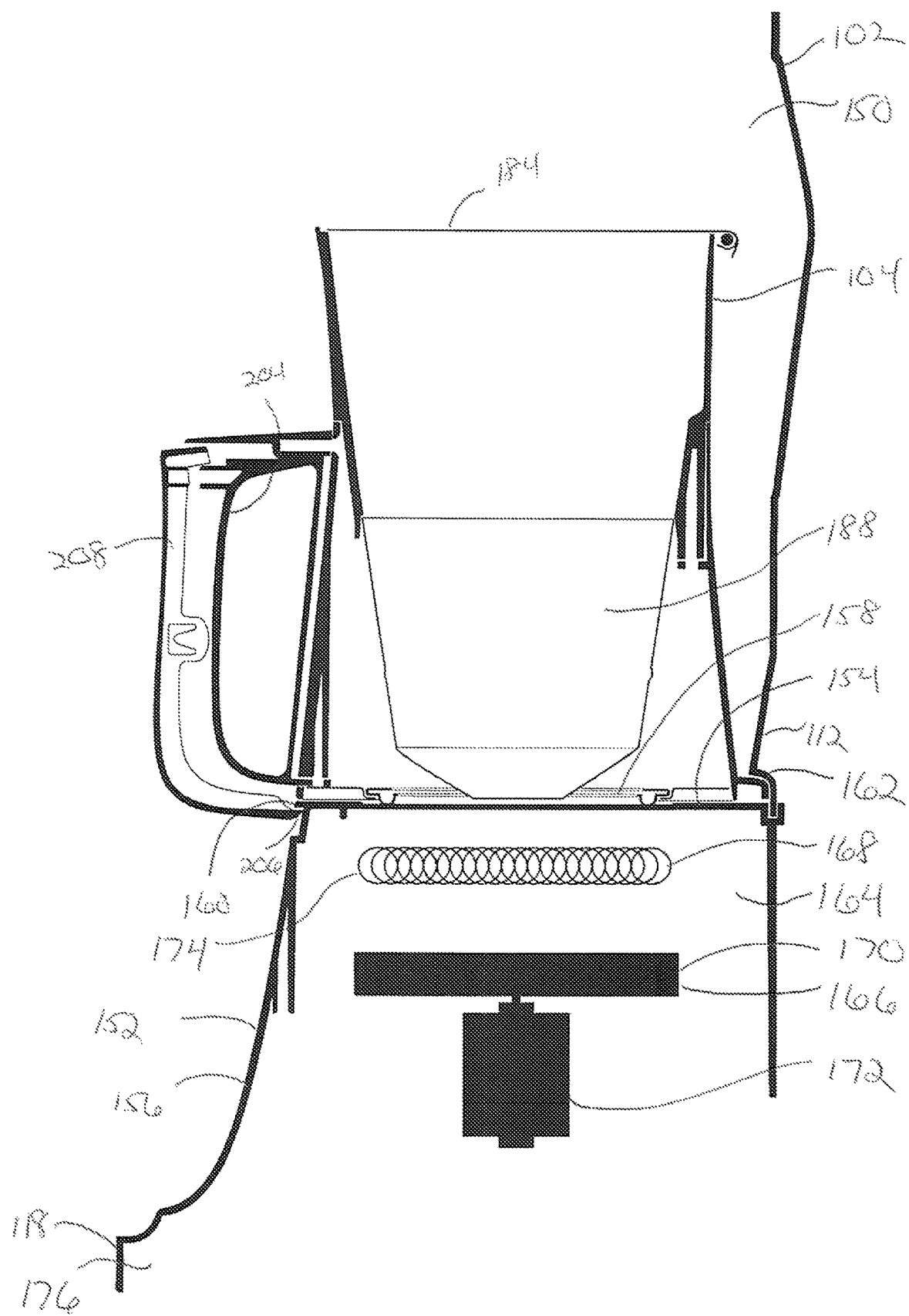
FIG. 18 is a partial section view of the theater-style popcorn popper of FIG. 1.
Figure 19:
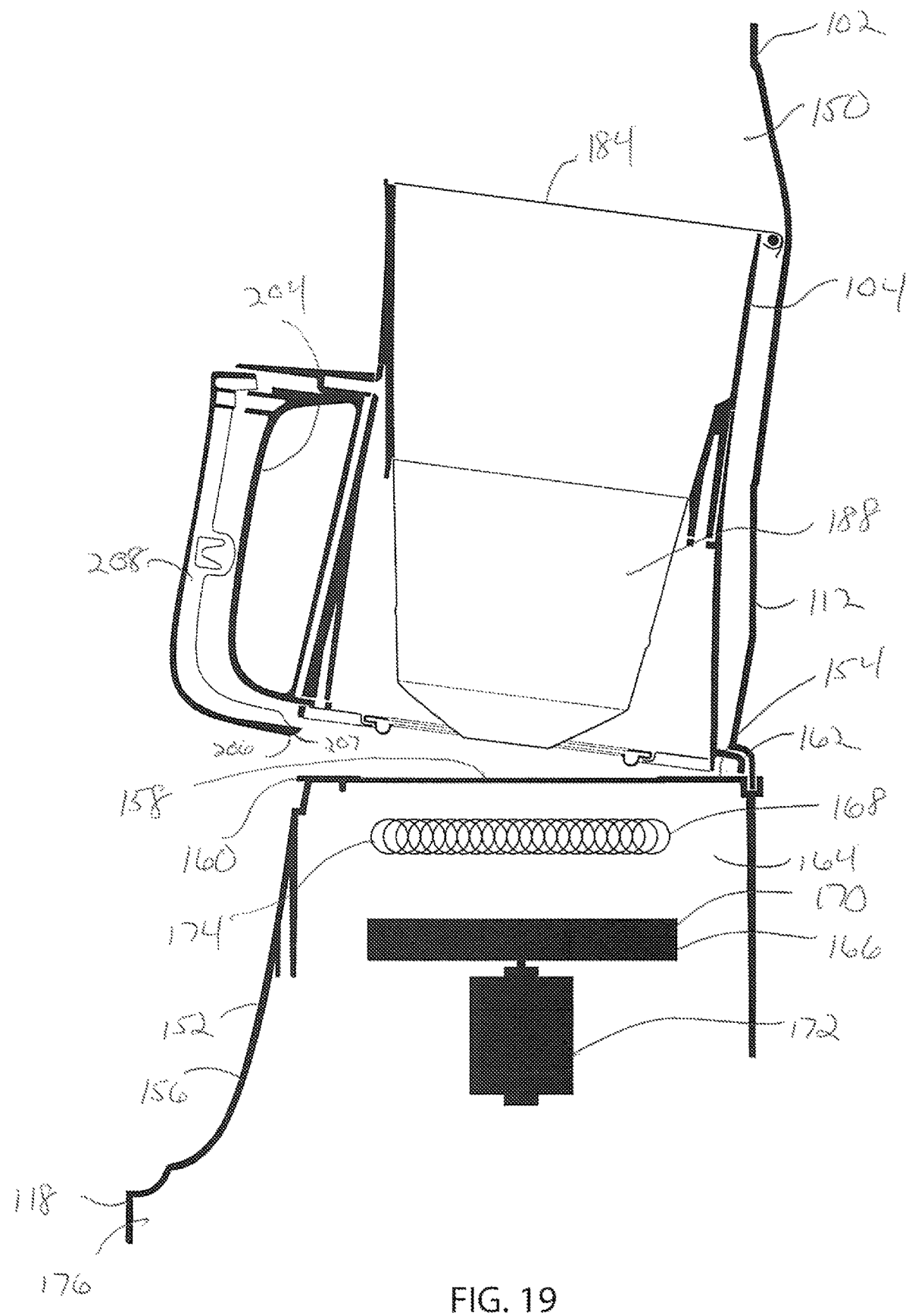
FIG. 19 is a partial section view of the theater-style popcorn popper of FIG. 1.

Within an interior portion 150 of the popper housing 102, the base assembly 118 defines a mounting platform 152 as illustrated in FIGS. 8, 18 and 19. Mounting platform 152 can comprise a mounting surface 154 that is supported by an elevated mounting wall 156. Mounting surface 154 can comprise an airflow screen 158. The mounting surface 154 can further include a latch receiver 160 oriented toward the front wall 114. Mounting surface 154 and rear wall 112 can cooperatively define a positioning recess 162. Mounting platform 152 generally defines an interior mounting area 164, which can accommodate a fan assembly 166 and a heating member 168. Fan assembly 166 can generally comprise a fan wheel 170 and motor 172 while heating member 168 can comprise a resistive heating element 174. Interior mounting area 164 is generally open to an interior base portion 176 that can accommodate controls, wiring and other electrical and safety necessities.

As shown in FIGS. 9-17, detachable popping pitcher 104 generally comprises a pitcher body 180 defined by a pitcher wall 182, an upper pitcher opening 184, a pitcher floor 186 and an interior heating zone 188. Pitcher body 180 can have a generally circular cross-section as illustrated or alternatively, the pitcher body 180 can have a cross-sectional shape selected from squares, rectangles, triangles and combinations thereof. Generally, the cross-section of pitcher body 180 will substantially resemble a cross-section of the mounting platform 152 to promote positioning and attachment of the pitcher body 180 relative to the mounting platform 152. Pitcher floor 186 generally includes a pitcher screen 190 formed of a mesh or screen material having apertures significantly reduced in size compared to individual popcorn kernels. Pitcher floor 186 can further define a positioning tab 191. Pitcher body 180 can further comprise a kernel retention mechanism 192 or means for retaining at the upper pitcher opening 184.

Figure 16:
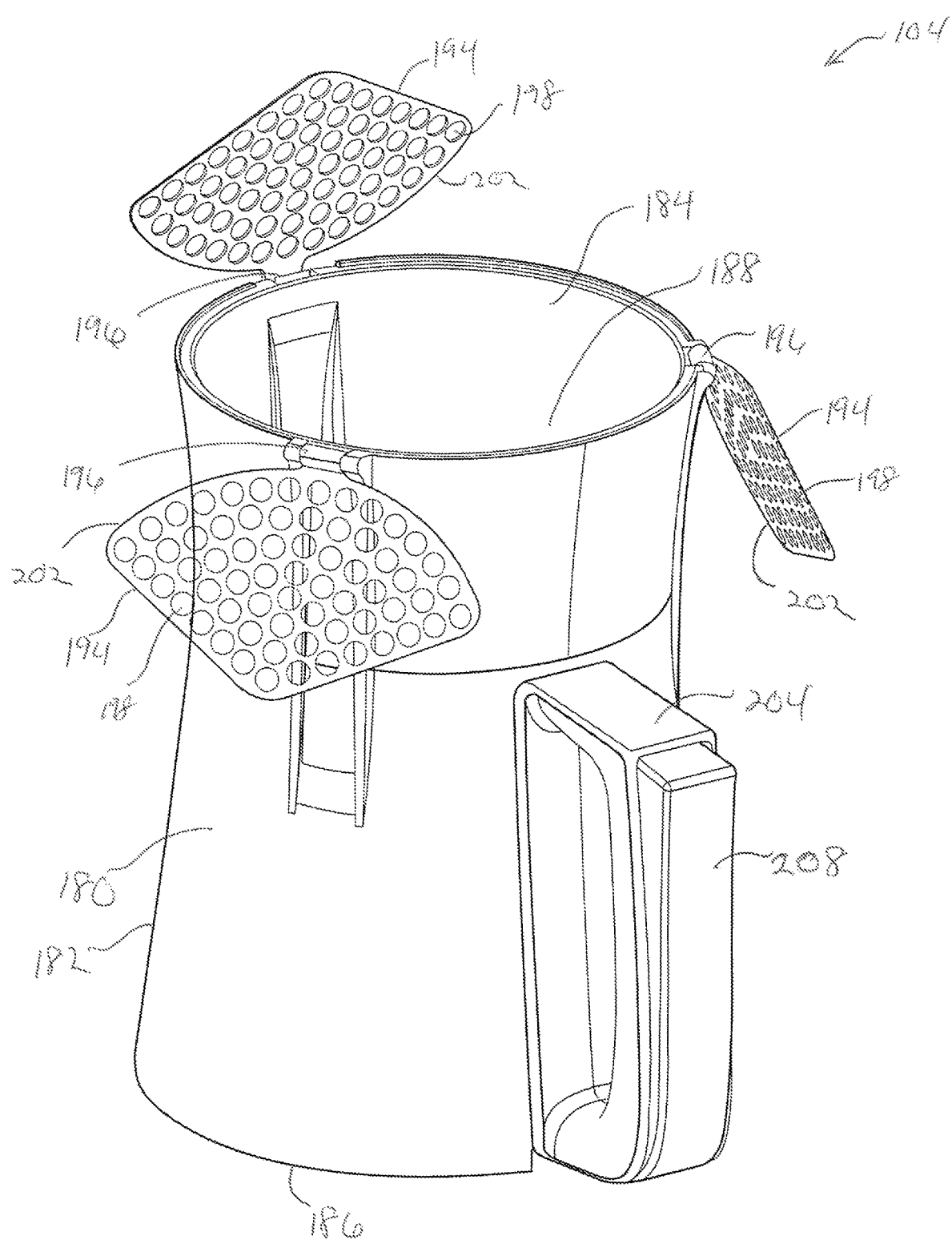
FIG. 16 is a top, perspective view of the detachable popping pitcher of FIG. 9 having a plurality of retention members in an open disposition.
Figure 17:
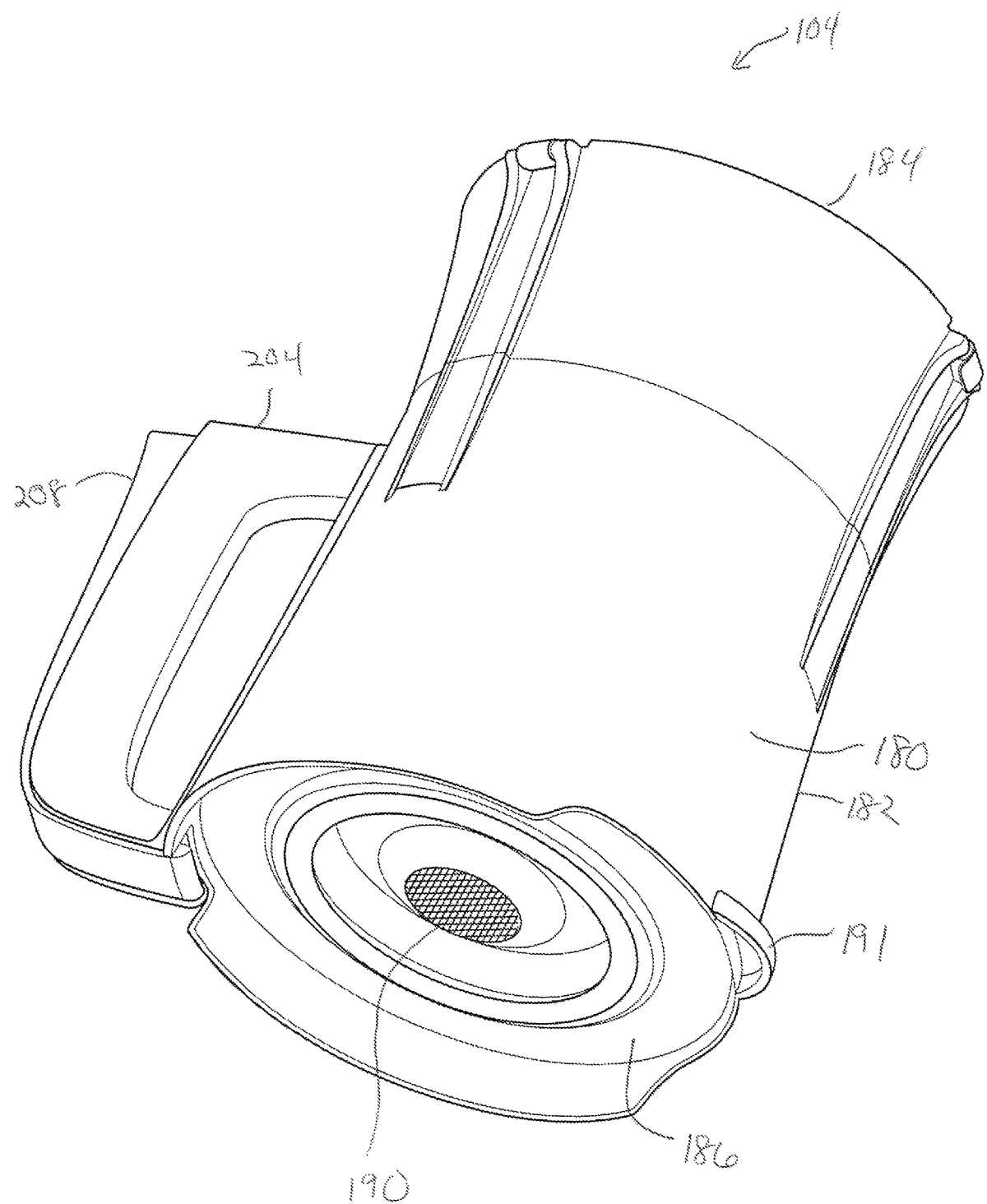
FIG. 17 is a bottom, perspective view of the detachable popping pitcher of FIG. 9.

In a representative embodiment, kernel retention mechanism 192 can comprise one or more lid members 194 that are attached to the upper pitcher opening 184 with a corresponding hinge assembly 196. Lid member 194 can comprise two or more lid members 194, such as, for example, three lid members 194 as illustrated with the only requirement being that in combination, the lid members 194 cover the entire upper pitcher opening 184. Each lid member 194 includes a plurality of lid vent openings 198. Each lid member 194 has a corresponding hinge assembly member 196 such that the lid members 194 are individually capable of transitioning between a covering disposition 200 as seen in FIGS. 7, 8, 13 and 15 and an open disposition 202 as seen in FIGS. 16, 20 and 21.

Attached to the pitcher body 180 is a pitcher handle 204. Proximate the pitcher floor 186, the pitcher handle 204 can define a latch member 206 having a tapered latch surface 207 as seen in FIGS. 18 and 19. Pitcher handle 204 can further comprise a latch actuator 208 that is operably interconnected to the latch member 206 such that depression of the latch actuator 208 changes the position of the latch member 206.

Figure 20:
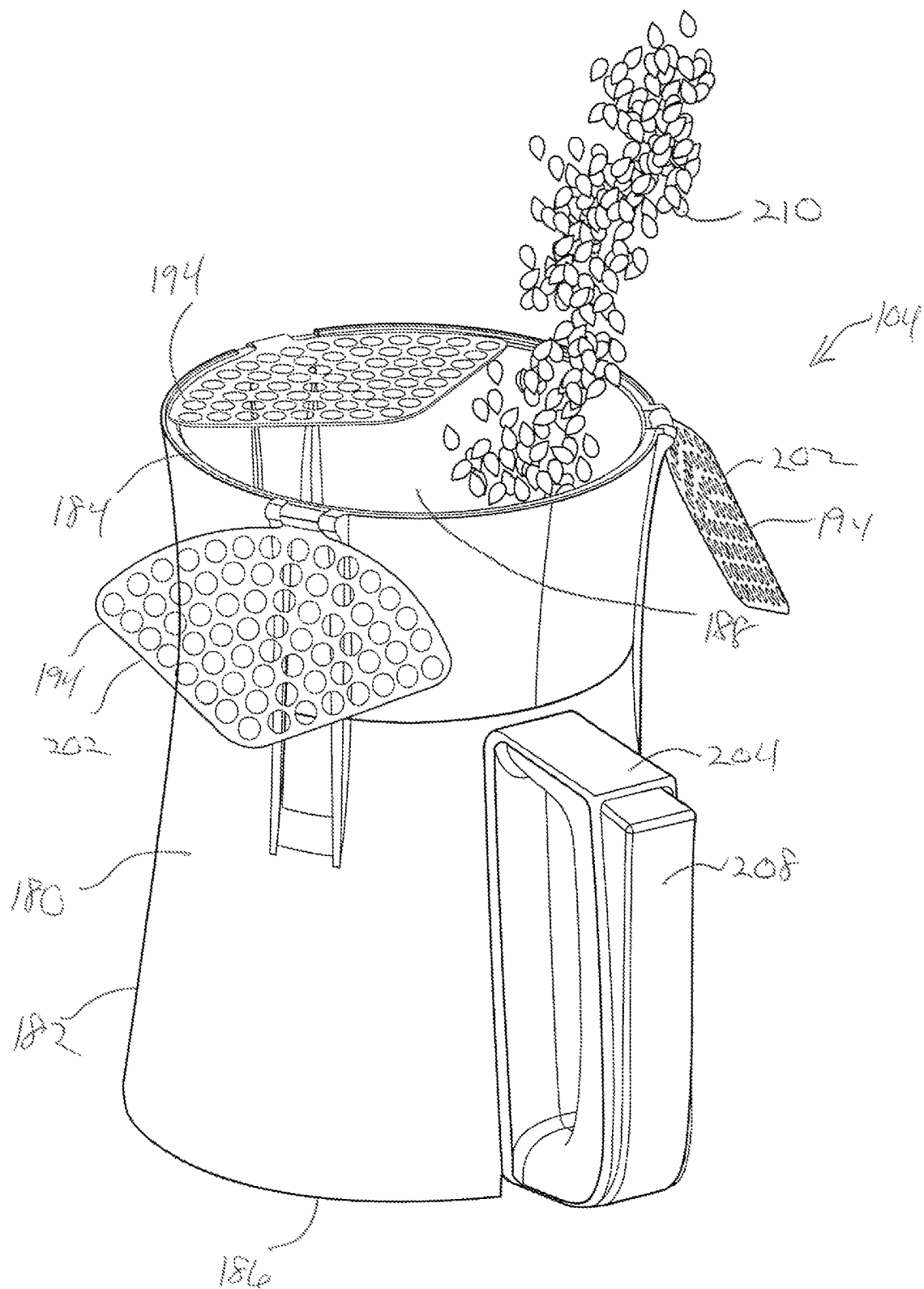
FIG. 20 is a top, perspective view of the detachable popping pitcher of FIG. 9.
Figure 21:
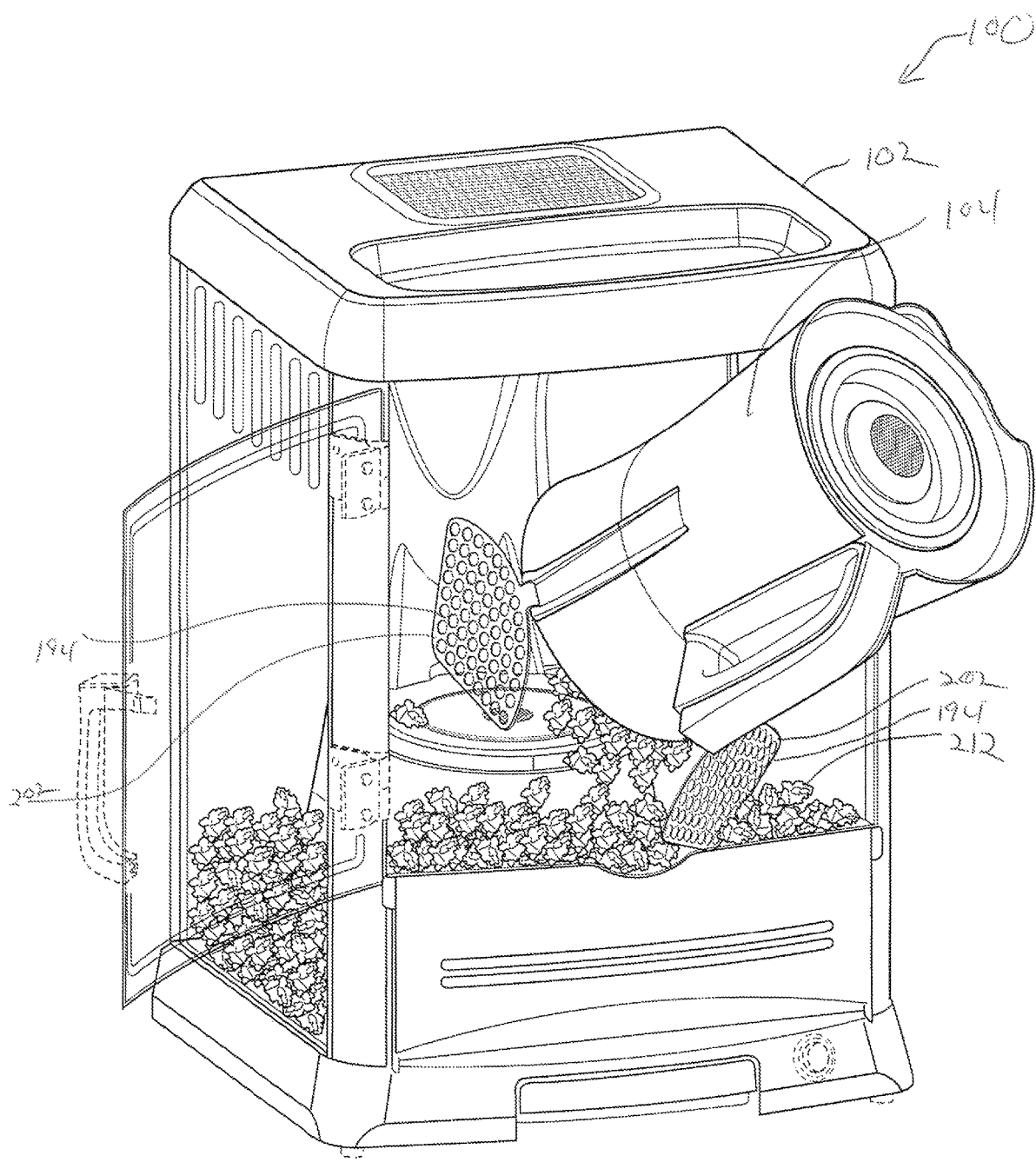
FIG. 21 is a front, perspective view of the theater-style popcorn popper of FIG. 1.

In order to use popcorn popper 100, popping pitcher 104 must be filled with unpopped kernels 210 as illustrated in FIG. 20. Generally, popping pitcher 104 is positioned outside of the popper housing 102 to provide easy access to the upper pitcher opening 184. If popping pitcher 104 includes kernel retention mechanism 192, the kernel retention mechanism is first directed to the open disposition 202 so as to provide unimpeded access to the interior heating zone 188 through upper pitcher opening 184. As the unpopped kernels 210 are poured into the interior heating zone 188, they accumulate on the pitcher floor 186 and are retained by the pitcher screen 190. Once the desired amount of the unpopped kernels 210 are poured into the popping pitcher 104, the kernel retention mechanism 192 can be directed to the covering disposition 200 to maintain the unpopped kernels 210 within the interior heating zone 188.

With the popping pitcher 104 filled with the desired amount of unpopped kernels 210, the user opens the transparent door 124 to allow access into the interior portion 150 of the popper housing 102 as shown in FIG. 19. The user directs the popping pitcher 104 proximate the mounting platform 152 and begins to engage the mounting platform 152 by guiding the positioning tab 191 into the positioning recess 162. With the positioning tab 191 positioned in the positioning recess 192, the user can lower the popping pitcher 104 such that the pitcher floor 186 sets onto the mounting surface 154. When the pitcher floor 186 is flush with the mounting surface 154, the tapered latch surface 207 causes the latch member 206 to slip past the latch receiver 160, such that the latch member 206 and latch receiver 160 in conjunction with the interaction of the positioning tab 191 and positioning recess 162, maintain the attachment and alignment of the popping pitcher 104 relative to the mounting platform 152 as shown in FIG. 18. With the popping pitcher 104 attached to the mounting platform 152, the airflow screen 158 and the pitcher screen 190 are aligned so as to allow airflow from the interior mounting area 164 into the interior heating zone 188.

With the popcorn popper 100 assembled through attachment of the popping pitcher 104 to the mounting platform 152, the user can plug in an electrical cord (not shown) and utilize the control button 132 to begin a popping cycle. Generally, the fan assembly 164 directs air through the heating member 168 and into the popping pitcher 104 through the aligned airflow screen 158 and pitcher screen 190 whereby the heated air interacts with the unpopped kernels 210 within the interior heating zone 188. Generally, the unpopped kernels 210 are agitated by the heated air and can even be carried upward by the heated air. If unpopped kernels 210 are carried upward, the eventually contact the kernel retention mechanism 192 which prevents the unpopped kernels 210 from exiting the interior heating zone 188. After a period of time, the unpopped kernels 210 begin reaching an internal temperature of at least 185° C., whereby moisture within the unpopped kernels 210 is converted to steam, thus causing the unpopped kernels 210 to "pop" and become a popped kernel 212. Each popped kernel 212 is substantially larger in physical volume following popping, thereby causing the internal heating zone 188 to become filled with popped kernels 212. As the popped kernels 212 accumulate and stack upon one another, eventually an upper level of the popped kernels 212 reaches the kernel retention mechanism 192. As the upper level of the popped kernels 212 contacts the kernel retention mechanism 192, the kernel retention mechanism 192 is physically forced upward and caused to transition from the covering disposition 200 to the open disposition 202, for example, by causing each lid member 194 to flip from the covering disposition 200 to the open disposition 202. As the kernel retention mechanism 192 transitions to the open disposition 202, the heated air blows upward through the upper pitcher opening 184 such that the popped kernels 212 begin exiting the internal heating zone 188 and begin to accumulate on the interior floor surface 136 of the base assembly 118.

After a period of time, the unpopped kernels 210 have "popped" and become popped kernels 212. At that point, the popping cycle is completed and the fan assembly 166 and heating member 168 are deenergized or turned off. At this point, the majority of popped kernels 212 have likely exited the popping pitcher 104 and reside on the interior floor surface 136. The user can open the door assembly 120 and grasp the pitcher handle 204. As the user grasps the pitcher handle, the latch actuator 208 can be depressed thereby causing the latch member 206 to retract away from the latch receiver 160. The user can then begin lifting the popping pitcher 104 away from the mounting platform 152 such that the positioning tab 191 is removed from the positioning recess 162. With the popping pitcher 104 fully detached from the mounting platform 152, the user can orient the popping pitcher 104 in an upside down orientation to empty any remaining popped kernels 212 from the interior heating zone 188 as shown in FIG. 21. The user can then remove the popping pitcher 104 from the popper housing 102, whereby the popping pitcher 104 can be reloaded with unpopped kernels 210 or alternatively, the popping pitcher 104 can be cleaned.

While a specific embodiment has been described above by way of illustration, it will be appreciated that the described principles are equally applicable to a wide range of popcorn popper products and configurations. More generally, numerous adaptations, modifications, combinations and juxtapositions of the features described above may be made without departing from the principles of the presently disclosed invention.

The invention claimed is:

1. A popcorn popper, comprising:
a removable popping pitcher comprising: a pitcher body, an upper pitcher opening having a hinged lid member, a pitcher floor comprising an opening, and an interior heating zone located between the pitcher floor and the hinged lid member, the hinged lid member being perforated to allow airflow out of the popping pitcher without disturbing the hinged lid member;
a base assembly comprising: a mounting platform supported by an elevated mounting wall, the base assembly defining an interior mounting area which comprises a fan assembly and a heating member;
the mounting platform comprising an opening and a portion formed to removably engage the popping pitcher such that the opening of the pitcher floor aligns with the opening of the mounting platform to allow heated air to flow from the interior mounting area of the base assembly to the interior heating zone of the popping pitcher;
the upper pitcher opening permitting a popped popcorn kernel to exit the upper pitcher to be collected by a container;
the container formed such that the base assembly forms a lower portion of the container, the container comprising a rear wall, a first side wall, a second side wall, and a top wall which combine with a door assembly to form an interior portion of the container, the interior portion enclosing the popping pitcher.

2. The popcorn popper of claim 1, wherein the popping pitcher comprises a latch mechanism and the base assembly comprises a latch receiver such that the popping pitcher latchably engages the base assembly when in use, the latch mechanism comprising a positioning tab sized for insertion into a positioning recess located in the rear wall and a latch member sized for engagement with a latch receiver portion of the mounting platform.

3. The popcorn popper of claim 1, wherein the popping pitcher further comprises a pitcher screen.

4. The popcorn popper of claim 1, wherein the pitcher screen is located at the opening of the pitcher floor.

5. The popcorn popper of claim 1, wherein the base assembly further comprises an airflow screen.

6. The popcorn maker of claim 1, wherein a temperature of the interior heating zone is raised to at least 185 degrees centigrade by heated air passing through the interior heating zone.

7. The popcorn maker of claim 1, wherein: the popping pitcher comprises a recess formed below the popping floor, and the portion of the mounting platform formed to removably engage the popping pitcher is located at least partially in the recess when the popping pitcher and the base assembly are engaged.

8. The popcorn popper of claim 1, wherein the popping pitcher comprises a lifting handle, the lifting handle further comprising a latch actuator mechanically coupled to the latch member such that the latch actuator releases the popping pitcher from the mounting platform when actuated.

9. A popcorn popper, comprising:
a removable popping pitcher comprising: a pitcher body, an upper pitcher opening, a pitcher floor comprising a floor opening and a pitcher screen located within the floor opening, an interior heating zone located between the pitcher floor and the upper pitcher opening, a latch mechanism, a lifting handle, the lifting handle further comprising a latch actuator mechanically coupled with the latch mechanism;
a base assembly comprising: a mounting platform supported by an elevated mounting wall, a latch receiver such that the popping pitcher latchably engages the base assembly when in use, the base assembly defining an interior mounting area which comprises a fan assembly and a heating member;
the mounting platform comprising a platform opening, an airflow screen positioned in the platform opening, and a portion formed to removably engage the popping pitcher such that the floor opening aligns with the platform opening to allow heated air to flow from the interior mounting area of the base assembly to the interior heating zone of the popping pitcher; and
the upper pitcher opening permitting a popped popcorn kernel to exit the upper pitcher to be collected by a container, the container not part of the interior heating zone and formed such that the base assembly forms a lower portion of the container, the container comprising a rear wall, a first side wall, a second side wall, and a top wall which combine with a door assembly to form an interior portion of the container, the interior portion enclosing the popping pitcher.

10. The popcorn maker of claim 9, wherein the popping pitcher comprises a kernel retention mechanism located adjacent to the upper pitcher opening, the kernel retention mechanism comprising a plurality of perforated hinged portions.

11. The popcorn maker of claim 9, wherein the popping pitcher comprises a recess formed in below the popping floor and the portion of the mounting platform formed to removably engage the popping pitcher is located at least partially in the recess when the popping pitcher and the base assembly are engaged.

* * * * *